Dec. 27, 1966 C. A. DRAPER, JR 3,294,983
VARIABLE "ONE-SHOT" MULTIVIBRATOR
Filed Jan. 2, 1964

EQUIVALENT TIMING CIRCUIT;
$Q_2$ CONDUCTING

EQUIVALENT TIMING CIRCUIT;
$Q_1$ CONDUCTING

INVENTOR:
COSBY A. DRAPER, JR.
BY [signature]
HIS ATTORNEY.

United States Patent Office 3,294,983

Patented Dec. 27, 1966

3,294,983

VARIABLE "ONE-SHOT" MULTIVIBRATOR

Cosby A. Draper, Jr., Lynchburg, Va., assignor to General Electric Company, a corporation of New York Filed Jan. 2, 1964, Ser. No. 335,024
8 Claims. (Cl. 307—88.5)

This invention relates to a multivibrator and, more particularly, to a monostable multivibartor wherein the duration of the period that the multivibrator is in the unstable state is varied as a function of the repetition rate of the triggering pulses.

A monostable multivibrator, or "one-shot" multivibrator as it is customarily referred to, is an electronic circuit which includes two cross-coupled conductive elements. The circuit is characterized by the fact that it has but a single stable or quiescent operating state, i.e., with one of the elements conducting and the other nonconducting. The appearance of an input triggering pulse of the proper polarity reverses the normal stable or quiescent operating state of the circuit so that the conducting state of the elements are reversed. This reversal is, however, temporary, and the monostable or one-shot multivibrator returns to its stable or quiescent state a fixed time after being triggered. The time that the circuit is in the unstable state is normally fixed by an internal R-C timing network forming part of the multivibrator. If the trigger pulse repetition rate changes, the duty cycle of these multivibrators, which is defined as the ratio of the time that the multivibartor is in its unstable state to the time between triggering pulses (i.e., the trigger pulse period), varies correspondingly. That is, since the time in the unstable state (the numerator) is fixed by the internal timing network, while the trigger pulse period (the denominator) varies, the duty cycle of the one-shot varies with the triggering rate.

For many purposes this change in the duty cycle of the one-shot multivibrator with the variations in the trigger pulse repetition rate is of no consequence. Under other circumstances, however, this may very well have deleterious effects. A need, therefore, exists for a one-shot multivibrator in which the duration of the unstable condition or state of the multivibrator is varied as a function of the trigger pulse repetition rate.

It is, therefore, an object of this invention to provide a monostable or one-shot multivibrator in which the duration of the unstable state of the device is varied as a function of the trigger pulse repetition rate.

Another object of this invention is to provide a one-shot multivibrator in which the timing circuitry is controlled as a function of the trigger pulse repetition rate so that the duration of the unstable state of the multivibrator is varied as a function of the repetition rate.

One area where such an adjustable one-shot multivibrator finds utility is in telephone signalling systems. The one-shot multivibrator is utilized to produce the energizing impulses for the E lead relay switch, thereby selectively connecting the E lead to the ground to effect the desired signalling function. In order to maintain the E lead "make" to "break" time ratio constant, though the dial tone pulse rate varies, a one-shot multivibrator in which the duration that the one-shot remains in the unstable state may be varied is highly desirable. One such signalling system, utilizing the instant adjustable multivibrator, is described and claimed in a copending application, entitled "Signalling System," Serial No. 335,206, filed on January 2, 1964, concurrently with the instant application, in the name of Cosby A. Draper, Jr., and assigned to the General Electric Company, the assignee of the present invention. It will, however, be appreciated that though the adjustable one-shot multivibrator is particularly useful in connection with the telephone signalling system described and claimed in the above-identified copending application the instant invention is by no means limited thereto and has uses in other and different environments.

By controlling the duration of the unstable state of the one-shot multivibrator as a function of the trigger pulse repetition rate, the duty cycle of the one-shot may be regulated and maintained substantially constant even through the trigger pulse rate varies.

It is, therefore, yet another object of this invention to provide a one-shot multivibrator having substantially constant duty cycle with varying trigger pulse rates.

Other objects and advantages of the instant application will become apparent as the description thereof proceeds.

In a preferred embodiment of the invention, the adjustable one-shot multivibrator includes a compensating network which produces a control signal proportional to the length of time that the one-shot is in the quiescent or stable state. This control signal is coupled to the timing circuit of the one-shot to vary the time that one-shot multivibrator is in the unstable state inversely with the trigger pulse rate. By thus varying the duration of the unstable state, the duty cycle of the one-shot multivibrator may be maintained substantially constant over a wide range of trigger pulse rates.

The novel features, which are believed to be characteristic of this invention, are set forth, with particularity, in the appended claims. The invention itself, however, both as to its organization and method of operation, together with further objects and advantages thereof, may best be understood by reference to the following description taken in connection with the accompanying drawings in which:

Figure 1:
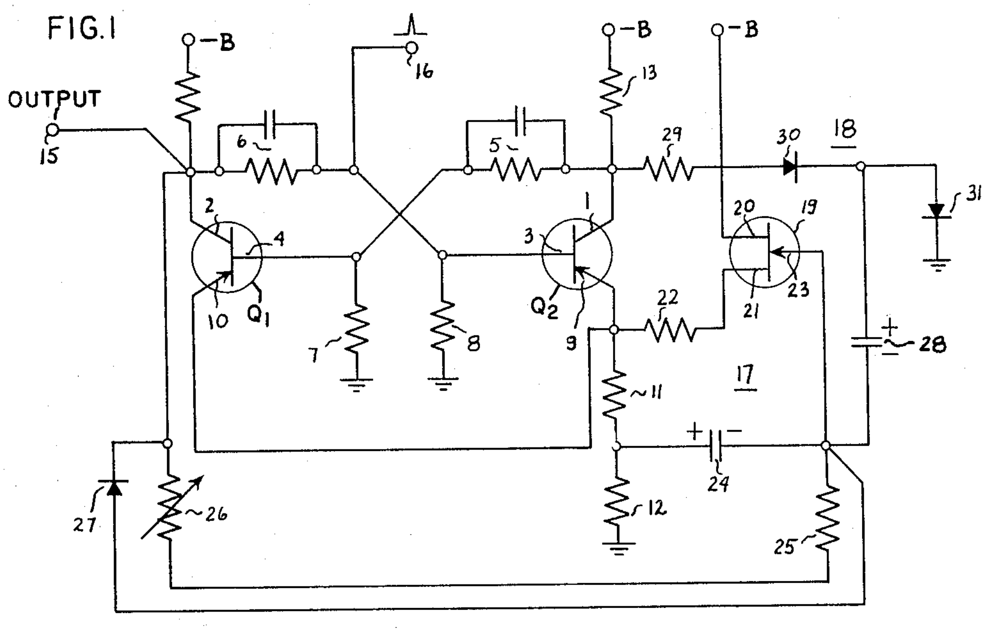
FIG. 1 is a circuit diagram of the adjustable one-shot multivibrator of the instant invention.

A one-shot multivibrator, constructed in accordance with the principles of this invention, is illustrated in FIG. 1. The one-shot consists of a pair of PNP junction transistors $Q_1$ and $Q_2$ having their collector electrodes 1, 2 and their base electrodes 3, 4 cross-coupled through the R–C coupling network 5 and 6. Collector 2 of transistor $Q_1$ is connected to base 3 of transistor $Q_2$ through R–C network 6, and collector 1 of transistor $Q_2$ is connected to base 4 of transistor $Q_1$ through R–C network 5. The bases 3 and 4 are also connected to ground through biasing resistors 7 and 8. Emitters 9 and 10 of transistors $Q_1$ and $Q_2$ are connected to ground through the common emitter resistances 11 and 12. Energizing voltage for the transistors is provided by connecting collectors 1 and 2 to the negative terminal B— of a source of energizing voltage through collector resistances 13 and 14. An output terminal 15 is connected to the collector of $Q_1$, and a trigger pulse input terminal 16 for periodically reversing the stable or quiescent state of the one-shot multivibrator is coupled to base 3 of transistor $Q_2$.

In the stable or quiescent state, transistor $Q_2$ conducts, and transistor $Q_1$ is cut off. With transistor $Q_2$ conducting, and at saturation, the saturation collector-emitter voltage of this transistor is so low that this voltage, which is coupled between base 4 and emitter 10 of $Q_1$ through network 5, is not sufficient to forward-bias the emitter-base junction. Transistor $Q_1$ is thus maintained in a nonconducting state, and the potential at collector 2 is substantially that of the B— terminal. A positive trigger pulse, appearing at input terminal 16, is applied to the base 3 of the normally conducting PNP transistor $Q_2$, driving the base more positive than the emitter. This reverse-biases the emitter-base junction of $Q_2$ and drives the transistor to cut-off. The voltage at collector 1 drops from essentially ground potential to that at the B— terminal. This negative-going pulse is applied through network 5 to base 4, forward-biasing the base-emitter junction of $Q_1$, driving it into the conducting state. When transistor $Q_1$ conducts, the voltage at its collector 2 rises from B— to ground potential, and the leading edge of a positive-going pulse appears at the output terminal 15.

The duration of this positive-going output pulse at terminal 15 is controlled by a timing circuit shown generally at 17 and a compensating network shown generally at 18. Timing circuit 17 is coupled to the one-shot and establishes the duration of the conducting period of transistor $Q_1$. Timing circuit 17 includes a unijunction transistor switch 19 having a base 20 connected directly to the B— terminal and a base 21 connected to ground through dropping resistor 22 and the common emitter resistances 11 and 12. Emitter 23 of the unijunction transistor is connected to the junction of an R–C timing network comprising capacitor 24 and resistances 25 and 26.

The voltage at the junction of emitter 23 and the R–C timing network establishes the time when the unijunction transistor switch fires to produce a short negative pulse which terminates conduction of $Q_1$ and returns the one-shot to its stable or quiescent state.

Unijunction transistor 19 is a solid-state semiconductor formed of a bar of *n* type silicon having two ohmic contacts 20 and 21 which form the base electrodes of the device. A single rectifying junction is formed between emitter 23 and base 20. An interbase resistance of several thousand ohms normally exists between bases 20 and 21. With no emitter current flowing, the silicon bar acts like a simple voltage divider, and a certain fraction, $\eta V_{BB}$, of the voltage across the bar appears at emitter 23. If the external voltage applied to emitter 23 from timing network 17 is less than $\eta V_{BB}$, which quantity is usually termed the intrinsic stand-off ratio of the unijunction transistor, the emitter is reverse-biased, and only a small emitter leakage current flows. If, however, the external voltage exceeds the intrinsic stand-off ratio, the emitter is forward-biased, and emitter current flows. This current consists primarily of holes injected into the silicon bar which holes move from emitter 23 to base electrode 20 and result in a corresponding increase in the number of electrons in the emitter-base region. As a result, there is a decrease in the resistance between the emitter 23 and base 20 so that, as emitter current increases, the emitter voltage difference decreases, and a negative resistance characteristic is obtained. A negative pulse is produced at base 21 whenever unijunction transistor 19 fires. For a further discussion of the characteristic and design criteria of the unijunction transistor, reference is hereby made to the "General Electric Transistor Manual," Third Edition, published by the General Electric Company, Semiconductor Products, 1224 W. Genessee St., Syracuse, N.Y. (1958), pp. 56–62.

Capacitor 24 of the timing network is connected between emitter 23 of the unijunction transistor and the junction of transistor-emitter resistances 11 and 12. Resistors 25 and 26 are connected between emitter 23 and the collector 2 of transistor $Q_1$. Diode 27 is connected in shunt with the series-combination of resistors 25 and 26. Diode 27 and resistors 25 and 26 constitute, respectively, the charging and discharging paths for capacitor 24 of the timing network and capacitor 28 of compensating network 18, presently to be described. Diode 27 is so poled as to be conductive and charge capacitor 24 to the voltage at the B— terminal during the stable or quiescent state of the one-shot. In the stable state, transistor $Q_2$ conducts, and transistor $Q_1$ is cut off. Collector 2 of transistor $Q_1$ is essentially at the B— voltage. Since the cathode of diode 27 is connected to collector 2 of transistor $Q_1$ and its anode is connected to ground through capacitor 24 and emitter resistance 12, diode 27 is in the conducting state. In the conducting state, diode 27 bypasses resistors 25 and 26 so that capacitor 24 is rapidly charged to the B— voltage with the polarity shown.

Whenever a positive trigger pulse reverses the conducting states of the transistors so that transistor $Q_1$ conducts, the voltage at collector 2 rises from B— to approximately ground potential, and diode 27 is reverse-biased. Capacitor 24 now discharges through resistor 25 and 26. In the absence of compensating network 18, the discharge rate of capacitor 24 is fixed by the R–C time constant of capacitor 24 and resistors 25 and 26 so that emitter 23 becomes sufficiently positive to fire unijunction transistor 19 a fixed time after the one-shot has been triggered by the positive pulse.

When unijunction transistor 19 fires, a short negative-going pulse is generated at base 21, which is coupled through resistor 22 to the emitter of PNP transistor $Q_1$, reverse-biasing the base-emitter junction and driving transistor $Q_1$ to cut-off. The voltage at collector 2 of transistor $Q_1$ goes substantially to the voltage of the B— terminal so that a negative pulse is applied to the base transistor $Q_2$, driving that transistor to the conducting state. Diode 27 now conducts (since collector 2 is once again at B—), and capacitor 24 charges rapidly back to B—, driving unijunction transistor 19 to cut-off. The one-shot multivibrator remains in the stable condition, with transistor $Q_2$ conducting, until the appearance of the next positive trigger pulse, whereupon the same sequence of events is again repeated. It will be noted that in the absence of compensating network 18, the one-shot multivibrator returns to its stable state a fixed period of time after the appearance of the trigger pulse, and this period of time is determined by the time constant of the R–C network consisting of capacitor 24 and resistors 25 and 26 and the intrinsic characteristics of unijunction transistor 19.

Compensating circuit 18 produces a control or compensating voltage which is a function of the time that the one-shot is in its stable or quiescent condition, and $Q_2$ is conducting. This voltage is utilized to control the discharge time of timing circuit 17, thereby varying the time necessary for the one-shot to return to its quiescent state after being triggered. The lower the trigger pulse repetition rate, the greater the timing interval between pulses. The time that the circuit is in the stable state, therefore, also increases. The magnitude of the control voltage from compensating circuit 18 is correspondingly greater which, in turn, increases the time necessary for timing circuit 17 to fire the unijunction transistor and return the one-shot to the stable condition. Conversely, an increase in the trigger pulse rate reduces the time that the one-shot is in the stable state. The magnitude of the control voltage from compensating circuit 18 is also reduced which, in turn, reduces the time interval before unijunction transistor 19 fires.

Compensating circuit 18 includes an R–C network comprising storage capacitor 28, a charging resistor 29, a series diode 30, and a shunt diode 31. Capacitor 28 is connected to collector 1 of $Q_2$ through resistor 29, and series diode 30, and to the junction of timing capacitor 24 and the charging diode 27. Diode 30 is poled to be conductive only when transistor $Q_2$ is in the conducting state, and collector 1 is substantially at ground potential, i.e., the one-shot multivibrator is in the stable or quiescent state. With the one-shot multivibrator in its quiescent state and transistor $Q_2$ conducting, diode 30 conducts and a charging path for the capacitor 28 is established to permit the capacitor to charge to a voltage level which is proportional to the time that the one-shot is in the stable state.

Figure 2A:
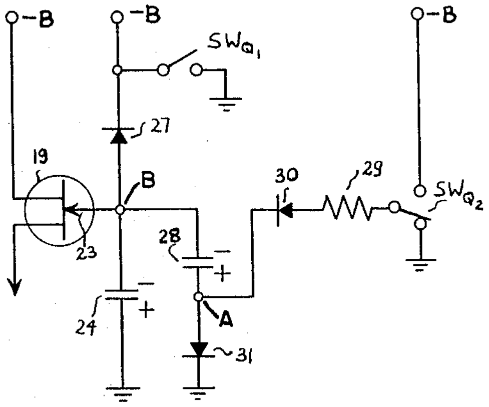
FIGS. 2A and 2B are equivalent circuits of the timing and compensating circuit of the instant invention.
Figure 2B:
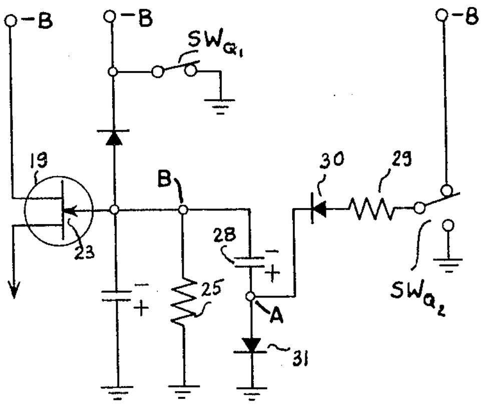

The manner in which he circuit operates may be most easily understood in connection with the equivalent simplified timing circuit diagram of FIGS. 2A and 2B. FIG. 2A illustrates the trigger timing circuit during the stable or quiescent state of the one-shot with transistor $Q_2$ conducting. In FIG. 2A, transistor $Q_2$ is illustrated, for the sake of simplicity, as a switch which alternately connects capacitor 28, etc. to ground and to the B— terminal.

Thus, with $Q_2$ conducting, collector 1 is substantially at ground potential, and diode 30 conducts. However, $Q_1$ is nonconducting and is essentially an open circuit so that its collector is essentially at the B— voltage. This is illustrated in FIG. 2A by means of the switch $SW_{Q1}$ which is shown in the open condition. Charging diode 27 thus has its cathode connected to the B— potential and charging current flows from ground through the switch $Q_2$, resistor 29, diode 30 to capacitor 28, charging it to the polarity shown. Simultaneously, charging current flows from ground to capacitor 24 and diode 27 to the B— terminal charging capacitor 24 rapidly to the B— voltage with the polarity shown.

The magnitude of the voltage to which capacitor 28 charges is a function of the charging interval which is, in turn, controlled by the time that $Q_2$ is conducting, and the one-shot is in a stable or quiescent condition. The R–C time constant of compensating network 18 is large compared to that of the timing circuit 17 so that the rate at which capacitor 28 charges towards the voltage of the B— terminal is very slow compared with the rate at which timing capacitor 24 charges. That is, the capacitance of capacitor 24 is deliberately made quite small, and the resistance in its charging path is the resistance of diode 27 in its forward direction; a resistance which is quite small. Hence, capacitor 24 charges quite rapidly, and almost instantaneously to the voltage of the B— terminal. The time constant for compensating circuit 18, on the other hand, is much larger than that of the timing circuit and is determined by the values of resistance 29, which is of substantial magnitude, and the capacitance of capacitor 28, which is substantially larger than the capacitance of capacitor 24. The time constant of the compensating network is, therefore, substantially larger than that of the timing circuit, and capacitor 28 charges much less rapidly than capacitor 24.

The combined discharge rate of capacitors 24 and 28 through discharge resistors 25 and 26 is substantially less than that of timing capacitor 24 alone, so that the voltage on capacitor 28 effectively controls the combined discharge time of the capacitors and varies the time which must expire before the voltage at the junction of capacitor 24, and unijunction emitter 23 is sufficiently positive to forward-bias the emitter and fire unijunction transistor 19. When the one-shot is triggered by a positive incoming pulse, terminating conduction of transistor $Q_2$ and initiating conduction of transistor $Q_1$, the equivalent timing circuit is that illustrated in FIG. 2B of the drawing. When transistor $Q_2$ ceases to conduct, the voltage at its collector drops essentially to the voltage at the B— terminal. This is illustrated in FIG. 2B by the fact that the switch $SW_{Q2}$ has moved from the lower ground contact to the upper contact to the B— terminal. The anode of diode 30 is now connected to B— and is more negative than the cathode, and the diode ceases to conduct. The charging path for capacitor 28 is thus interrupted.

Capacitor 24 of timing circuit 17, which has charged to the voltage at the B— terminal, now begins to discharge through resistors 25 and 26 which are in shunt with capacitor 24 and in shunt with the series-combination of capacitor 28 and diode 31. Capacitor 28, which has not charged to the full B— value but to some lesser value, between B— and the critical firing voltage of the unijunction transistor 19, does not begin to discharge through resistors 25 and 26 until capacitor 24 has discharged to the voltage level at capacitor 28. As long as the voltage across capacitor 24 exceeds the voltage across capacitor 28, diode 31 is reverse-biased, and capacitor 28 cannot discharge. That is, with transistor $Q_1$ conducting, its collector is substantially at ground so that switch $SW_{Q1}$ has effectively been closed, clamping the cathode of diode 27 to ground potential and reverse-biasing the diode. When diode 27 is reverse-biased, conduction is interrupted, and capacitor 24 is now in shunt with the discharge resistors 25 and 26 and the series-combination of capacitor 28 and diode 31. The voltage at capacitor 24 is the voltage at the B— terminal to which the capacitor has charged. Hence, the voltage at junction B of these three shunt circuits is at B— with respect to ground. Since these three circuits are in parallel the voltage across each one of them may also be equal to B—. The voltage across capacitor 28 is less than B— since capacitor 28 did not charge up to the full value of the B— voltage. The lower plate of the capacitor is more positive than the upper plate by an amount equal to the voltage across the capacitor. Consequently, point A, at the junction of capacitor 28 and diode 31, is also more positive than junction point B by an amount equal to the voltage across capacitor 28. Since this voltage is less than B— the difference voltage appears across diode 31, and its anode is more negative than its cathode by this difference voltage. The diode is thus reverse-biased and is in a nonconducting state and prevents discharge of capacitor 28 until capacitor 24 has discharged sufficiently through resistors 25 and 26 to reduce the voltage across the capacitor and at junction B to, or slightly below, the voltage to which capacitor 28 is charged. Once that point has been reached, diode 31 becomes conductive, and capacitor 28 begins to discharge through resistors 25 and 26.

Using a numerical example in order to simplify the matter further, assume that the voltage at the B— terminal is —36 volts; the voltage across capacitor 24 and, hence, the potential at terminal B is —36 volts with respect to ground. The voltage across the series-combination of capacitor 28 and diode 31 must, therefore, also be —36 volts, since this circuit is connected in parallel with capacitor 24. Assume now that capacitor 28 has charged to a value of voltage (—22 volts) intermediate the unijunction critical firing voltage (—16 volts, for example), and the voltage at the B— terminal (—36 volts). The voltage at junction point A, between capacitor 28 and diode 31 is thus 22 volts more positive than the voltage at junction point B by virtue of the voltage across capacitor 28 and its polarity. However, this means that the junction A is still at —14 volts with respect to ground; the voltage difference across the two capacitors. Since the cathode of diode 31 is grounded, the anode is now 14 volts more negative than the cathode, and the diode is reverse-biased. Capacitor 28 cannot discharge until capacitor 24 has discharged sufficiently to reduce the voltage at junction B and across the series-combination of capacitor 28 and diode 31 to or slightly below —22 volts at which time the anode of diode 31 becomes more positive than the cathode, and the diode conducts.

When diode 31 conducts and capacitor 28 begins to discharge through the common discharge resistors 25 and 26, the time constant of the combined R–C network and, hence, the time required for the voltage at junction A to rise sufficiently to equal or exceed the firing voltage for the unijunction transistor 19 has been substantially increased since the capacity of the R–C circuit has now been increased. That is, since capacitors 24 and 28 are connected in parallel, the total capacity of the network is the sum of their capacitances; i.e., $C_T=C_{24}+C_{28}$. If capacitor 28 is very large compared to capacitor 24 ($C_{28}\approx 50C_{24}$), the time constant for the network is now essentially $C_{28}R25+26$. The time required for the emitter voltage to reach the critical firing voltage varies as a function of the voltage level of capacitor 28, thereby controlling the time that transistor $Q_1$ remains in the conducting state. It will be obvious that the greater the voltage across capacitor 28 (i.e., the greater the charge Q stored by this capacitor), the longer the interval necessary for the capicitors to discharge sufficiently to raise the voltage at emitter 22 to the triggering point. Conversely, the lower the voltage to which capacitor 28 has charged, the shorter the time needed for the voltage to rise to the level at which emitter 23 is forward-biased. Thus, it can be seen that compensating network 18 produces a voltage across capacitor 28 which controls the intervals during which transistor $Q_1$ conducts, and that this control voltage and the conduction interval is a function of the duration of the quiescent or stable state of one-shot multivibrator which, in turn, is a function of the pulse repetition rate of the trigger pulses.

One adjustable one-shot multivibrator, which was constructed according to principles of the instant invention and was found to operate satisfactorily in the manner described, included the following components and their values:

$Q_1$ and $Q_2$ are General Electric 2N1375 PNP transistors
Unijunction transistor 19
Diodes 27, 30, and 31
Resistors:
- 5—15 kiloohms
- 6—15 kiloohms
- 7—15 kiloohms
- 8—15 kiloohms
- 11—330 ohms
- 12—33 ohms
- 13—3.9 kiloohms
- 14—2.2 kiloohms
- 25—1.0 kiloohms
- 26—15 kiloohms variable potentiometer
- 29—10 kiloohms Capacitors:
- 5—.01 microfarad
- 6—.01 microfarad
- 24—1 microfarad
- 28—47 microfarads While a particular embodiment of this invention has been shown, it will, of course, be understood that it is not limited thereto since many modifications, both in the circuit arrangement and the devices employed, may be made. It is contemplated by the appended claims to cover any such modifications as fall within the true spirit and scope of this invention.

What I claim as new and desire to secure by Letters Patent of the United States is:

1. In a variable width pulse generator the combination comprising,
   (a) a monostable multivibrator having two cross-connected conductive devices having a stable state during which one of the devices is normally conducting and the other of which is normally nonconducting;
   (b) a trigger input terminal coupled to the normally conducting device for reversing the conductive states of the devices in response to a trigger pulse;
   (c) an output pulse terminal connected to the normally nonconducting device, the width of the output pulse appearing at said terminal being equal to the interval that the normally nonconducting device is in the conducting state;
   (d) a timing circuit coupled to said multivibrator including a voltage sensitive switch for generating a pulse which returns the multivibrator to its stable state, an R–C biasing network for said switch which charges during the interval that the normally conductive states of the devices have been reversed until a predetermined voltage level is achieved and said switch conducts, thereby generating a pulse;
   (e) a control circuit coupled between the normally conductive device and said timing circuit for producing a voltage proportional to the duration that said normally conductive device is conducting, said control voltage varying the time required for the R-C biasing network to charge to the predetermined voltage level, thereby varying the time that the normally conductive device conducts and the width of the pulse at the output terminal.

2. In a variable width pulse generator the combination comprising,
   (a) a monstable multivibrator having two cross-connected conductive devices having a stable state during which one of the devices is normally conducting and the other of which is normally nonconducting;
   (b) a trigger input terminal coupled to the normally conducting device for reversing the conductive states of the devices in response to a trigger pulse;
   (c) an output pulse terminal connected to the normally nonconducting device, the width of the output pulse appearing at said terminal being equal to the interval that the normally nonconducting device is in the conducting state;
   (d) a timing circuit coupled to said multivibrator, including an R-C biasing network, the capacitor of said network being rapidly discharged through a first low resistance path when the multivibrator is in its stable state and charging through a higher resistance path when the multivibrator is triggered into the unstable state, a voltage sensitive switch coupled to said network which is triggered into conduction when the capacitor of said network has charged to a predetermined level to generate a pulse which returns the multivibrator to its stable state;
   (e) a control circuit coupled between the normally conductive device and said timing circuit for producing a voltage proportional to the duration that said normally conductive device is conducting, said control voltage varying the time required for the R-C biasing network to charge to the predetermined voltage level, thereby varying the time that the normally nonconductive device conducts and the width of the pulse at the output terminal.

3. A variable width pulse generator, according to claim 2, wherein said low resistance path includes a unidirectional conductive device which is conducting only if the normally nonconductive device of the multivibrator is not conducting.

4. A variable width pulse generator, according to claim 2, wherein the capacitor of said network is connected in series with the parallel combination of a resistor means and a diode, the diode being so poled as to be conductive and rapidly discharge said capacitor only if the normally nonconducting device is not conducting.

5. A variable width pulse generator, according to claim 4, wherein the voltage sensitive switch is a unijunction transistor having emitter and base electrodes with the emitter being coupled to the junction of the capacitor and resistor means of the R-C network.

6. A variable width pulse generator, according to claim 1, wherein said control circuit includes an R-C network and a unidirectional conductive device coupled between the normally conductive device and the timing circuit, the capacitor charging only during the conducting interval of the normally conductive device.

7. A variable width pulse generator, according to claim 2, wherein said control circuit includes a resistor, capacitor, and diode connected in series between the normally conductive device and the R-C network of the timing circuit, whereby the diode is in the conducting state when the normally conductive device is conducting, whereby the capacitor discharges through the resistor to a degree determined by the time the multivibrator is in the stable state, and the diode is conducting.

8. A variable width pulse generator, according to claim 7, wherein a further diode is coupled to the junction of the resistor and capacitor of the control circuit, said further diode being so poled that it becomes conductive, permitting the control circuit capacitor to charge only when the timing circuit capacitor has charged to the value of voltage on the control circuit capacitor, whereby both capacitors charge, and the time required for the voltage to reach the predetermined level to fire the voltage sensitive switch is substantially determined by the control circuit capacitor and the voltage level across it.

No references cited.

ARTHUR GAUSS, *Primary Examiner.*

R. H. EPSTEIN, *Assistant Examiner.*